March 11, 1952

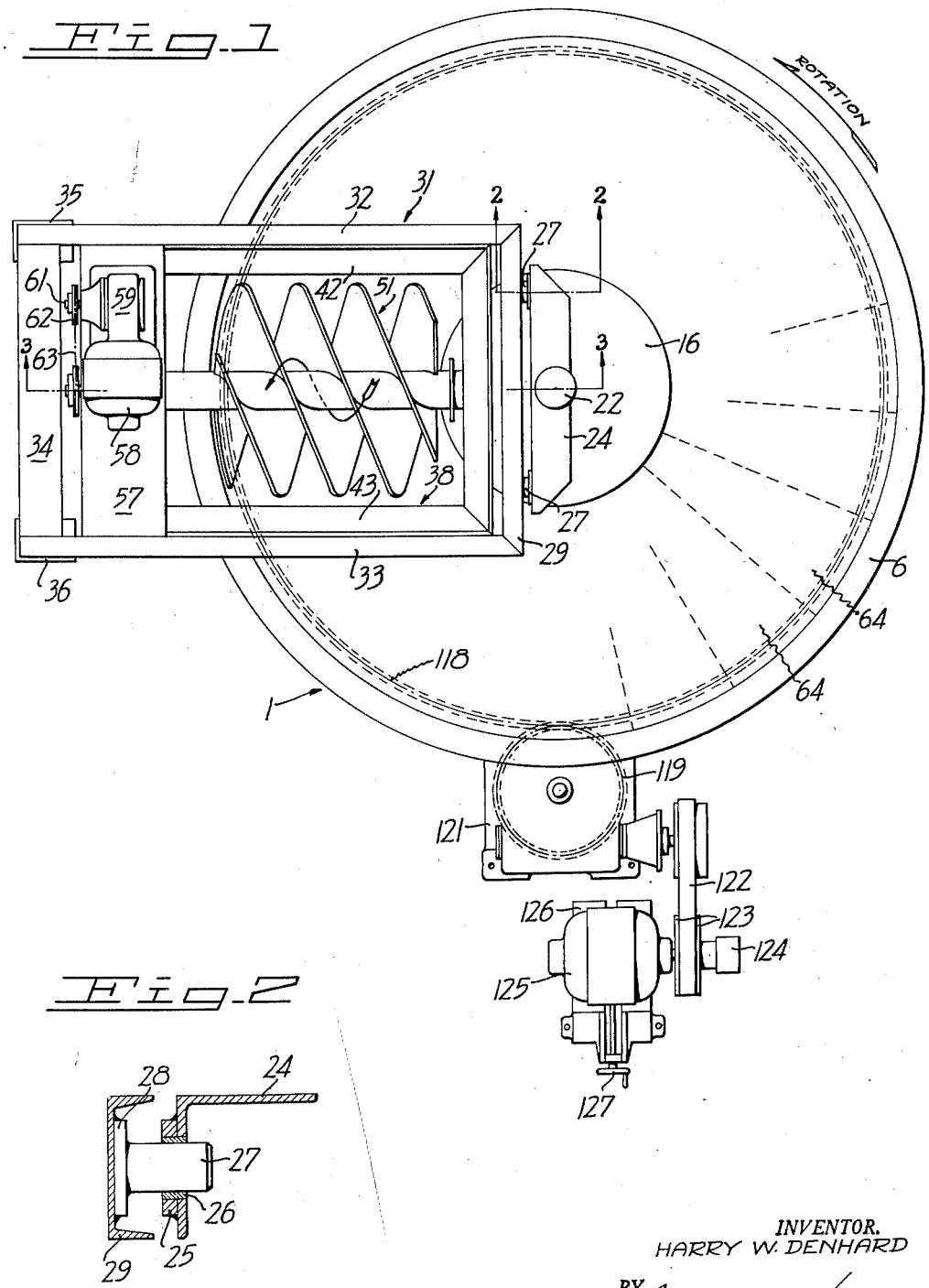

H. W. DENHARD 2,588,912

CONTINUOUS ROTARY TABLE FILTER PROVIDED
WITH MULTIPLE SCROLL DISCHARGER

Filed Nov. 10, 1947

INVENTOR.
HARRY W. DENHARD

BY

His Attorneys

INVENTOR.
HARRY W. DENHARD
His Attorneys

Patented Mar. 11, 1952

2,588,912

UNITED STATES PATENT OFFICE 2,588,912

CONTINUOUS ROTARY TABLE FILTER PROVIDED WITH MULTIPLE SCROLL DISCHARGER

Harry W. Denhard, Sebastopol, Calif., assignor to Oliver United Filters Incorporated, Oakland, Calif., a corporation of Nevada Application November 10, 1947, Serial No. 785,032

4 Claims. (Cl. 210—202.5)

This invention relates in general to a continuous rotary table filter, and more particularly to a filter of this type provided with a multiple flight scroll discharger.

A rotary table filter includes a horizontally disposed annular pan arranged for rotation about its own axis and defined by an annular bottom provided with upstanding inner and outer rims. Dividing this pan into a plurality of identical and independent filtrate compartments are radially extending division strips secured along their lower edges to the pan bottom, and at their ends to the inner and outer upstanding pan rims. Disposed within each of the filtrate compartments so formed, is a drainage member or screen, and supported on each drainage screen is a filter medium fastened at its radial edges to the adjacent division strips, and at its peripheral edges to the inner faces of said inner and outer rims. Carried by the pan is a coaxial automatic filter valve by which each of the filtrate compartments can be subjected successively to any desired differential pressure. In addition to this, some means must be provided for continuously removing the solids deposited on the upper surface of the filter medium as a result of the filtering cycle.

Although many expedients have been resorted to in attempting to efficaciously accomplish this latter purpose, none of them have proved to be entirely satisfactory.

In general the object of this invention is the provision in a table type continuous filter of a multiple flight discharge scroll disposed radially over the filter pan and of such construction that it will continuously and effectively move substantially all of the cake or solids passing beneath it radially outward and over the outer rim of the pan without permitting any substantial amount of the solids to pass transversely through it to a point beyond the discharge zone.

More specifically, the object of this invention is the provision in a table type of filter of a multiple flight discharger scroll disposed radially over the filter pan and in which the diameter of the scroll and the number and pitch of its flights are so correlated that they form an effective barrier or dam against the passage of solids transversely therethrough, and form spaced parallel walls between which the solids are packed and through which the solids slide during their bodily radial movement over the filter medium and over the outer rim or lip of the filter.

A further object of this invention is a provision in a continuous table filter of a multiple scroll discharger of such construction that it occupies only a minimum of the filtering area of the filter.

The invention possesses other advantageous features, some of which, together with the foregoing, will be set forth at length in the following description, where the invention is outlined in full with particular reference to the embodiment illustrated in the accompanying drawings. Although such drawings illustrate a specific form of the invention, it is to be understood that it is not limited to such embodiment, since the invention as set forth in the claims may be embodied in other forms.

Referring to the drawings:

Fig. 1 is a top plan view of a continuous table filter embodying the objects of this invention.

Fig. 2 is a section taken on the line 2—2 of Fig. 1.

Figure 3:
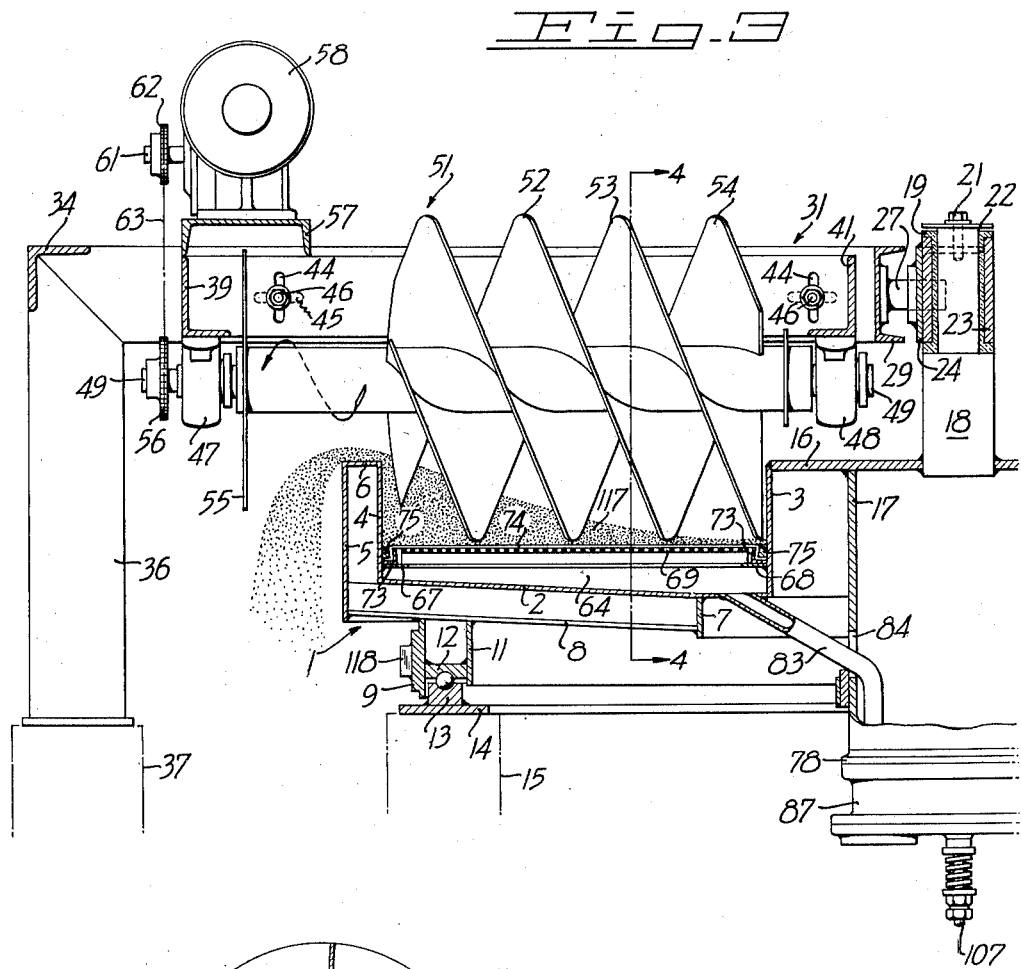
Fig. 3 is a vertical section taken on the line 3—3 of Fig. 1.
Figure 4:
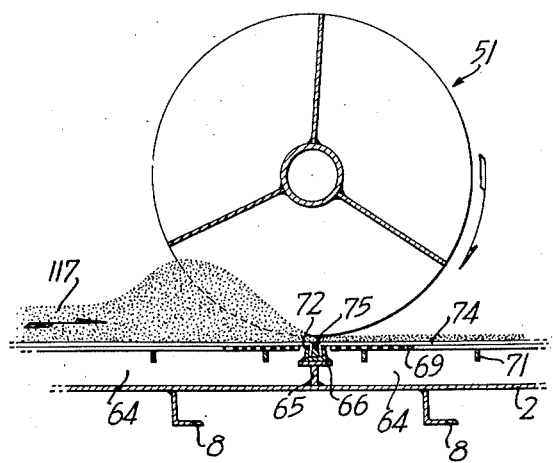
Fig. 4 is a vertical transverse section taken on line 4—4 of Fig. 3.

The filter shown in these various figures comprises an annular pan generally designated by the reference numeral 1, and which includes an annular plate 2 having a slight downward inclination towards the axis thereof, and a circular upwardly extending inner rim 3 welded or otherwise secured to the bottom plate 2 and a circular upwardly extending outer rim 4 likewise similarly secured to the bottom plate 2. Concentric with the outer rim 4 and outwardly spaced therefrom is an upstanding plate 5 and fastened across the upper edges of the plate 5 and rim 4 is an annular plate 6 forming a lip over which the solids deposited on the filter medium of the filter must be discharged as shown in Fig. 3. Welded to the lower face of the annular plate 2 adjacent its inner end is a downwardly extending ring 7, and welded to the plate 5 and ring 7 beneath the bottom 2 are a plurality of radially extending angle irons 8. Depending from the annular pan 1 and welded to the angle irons 8 are a pair of spaced concentric rings 9 and 11 bridged by an upper ball race 12 and supported on a lower angle ball race 13. The lower race 13 is in turn welded to an annular plate 14 supported by an annular pedestal 15.

Covering the top of the rim 3 and welded thereto is a circular plate 16 and depending from this plate and welded thereto is a concentric valve pipe 17. Welded to the plate 16 concentric therewith is a stepped stub shaft 18, and mounted over the upper end of this shaft is a flanged bushing 19. Fastened to the upper end of the shaft 18 by the cap screw 21 is a washer 22 serving to hold the bushing 19 in place. Surrounding the bushing 19 is a sleeve 23, and welded to the sleeve 23 and extending on either side thereof is an angle iron 24 (see Figs. 1, 2 and 3) serving as a cross arm. Welded to the angle iron 24 on either side of the shaft 18 is a ring 25 serving as a boss, and seated in each of these rings and in a concentric bore formed in the vertical leg of the angle iron 24 is a bearing ring 26. Seated in each of the rings 26 is a pin 27 provided with a head 28, and welded to each of the heads 28 is an inner cross member 29 of a rectangular frame generally designated by the reference numeral 31, and which extends radially of the filter pan 1. In addition to the inner cross member 29 which is of channel form, the rectangular frame 31 includes a pair of parallel side members 32 and 33 of channel construction, and an outer angle iron cross member 34. The outer end of the rectangular frame 31 is mounted at its corners on a pair of upstanding legs 35 and 36 supported on suitable pedestals 37.

Accommodated within the rectangular frame 31 is a rectangular scroll supporting frame generally designated by the reference numeral 38, and which includes a pair of opposed angle iron cross members 39 and 41 and a pair of opposed parallel side members 42 and 43. Each of the side members 42 and 43 is provided at either end thereof with a vertical slot 44, and each of the side members 32 and 33 of the frame 31 is provided at either end thereof with a horizontal slot 45. The scroll supporting frame 38 may be conveniently and adjustably mounted on the outer frame 31 by bolts 46 passing through the four pairs of crossed slots 44 and 45. Fastened to the lower faces of the cross members 39 and 41 are aligned bearings 47 and 48, and journaled in these bearings is a shaft 49 on which is mounted a scroll generally designated by the reference numeral 51 and which includes overlapping flights 52, 53 and 54. The outer end of the scroll 51 is provided with a circular guard 55 and fastened to the outer end of the shaft 49 is a sprocket 56.

Extending across the side members 32 and 33 of the outer frame 31 is a channel 57, and mounted on this channel is an electric motor 58 provided with a speed reducer 59 including a drive shaft 61. Keyed to the drive shaft 61 is a sprocket 62, and extending around this sprocket and the sprocket 56 is a roller chain 63. By this means the scroll 51 can be driven at any desired speed within the limits of the motor and its associated speed reducer.

The pan 1 is divided into a plurality of identical filtrate compartments 64 by radially extending division strips 65 welded along their lower edges to the annular plate 2, and at their ends to the inner and outer rims 3 and 4. Welded to the upper edge of each of the division strips 65 is a strip 66, similar strips 67 and 68 being welded to the inner walls of the rims 3 and 4 so as to form a frame over each of the filtrate compartments. Seated on these frames within each of the filtrate compartments is a drainage screen 69 provided on its lower surface with radial ribs 71, the ends of which overlie the strips 67 and 68. Welded to the upper face of each radial strip 66 is a channel 72, and welded to the upper face of each of the strips 67 and 68 is an angle iron 73 which with the rims 3 and 4 form a channel similar to the channels 72. Disposed over each of the drainage screens 69 is a filter medium 74, the peripheral edges of which are accommodated in the radial channels 72 and in the peripheral channels formed by the angle irons 73 and the inner and outer rims 3 and 4. Each section of the filter medium 74 is locked in place over its associated filtrate compartment by means of any suitable calking 75 such as manila rope, asbestos or lead, depending upon the use to which the filter is to be put.

Figure 5:
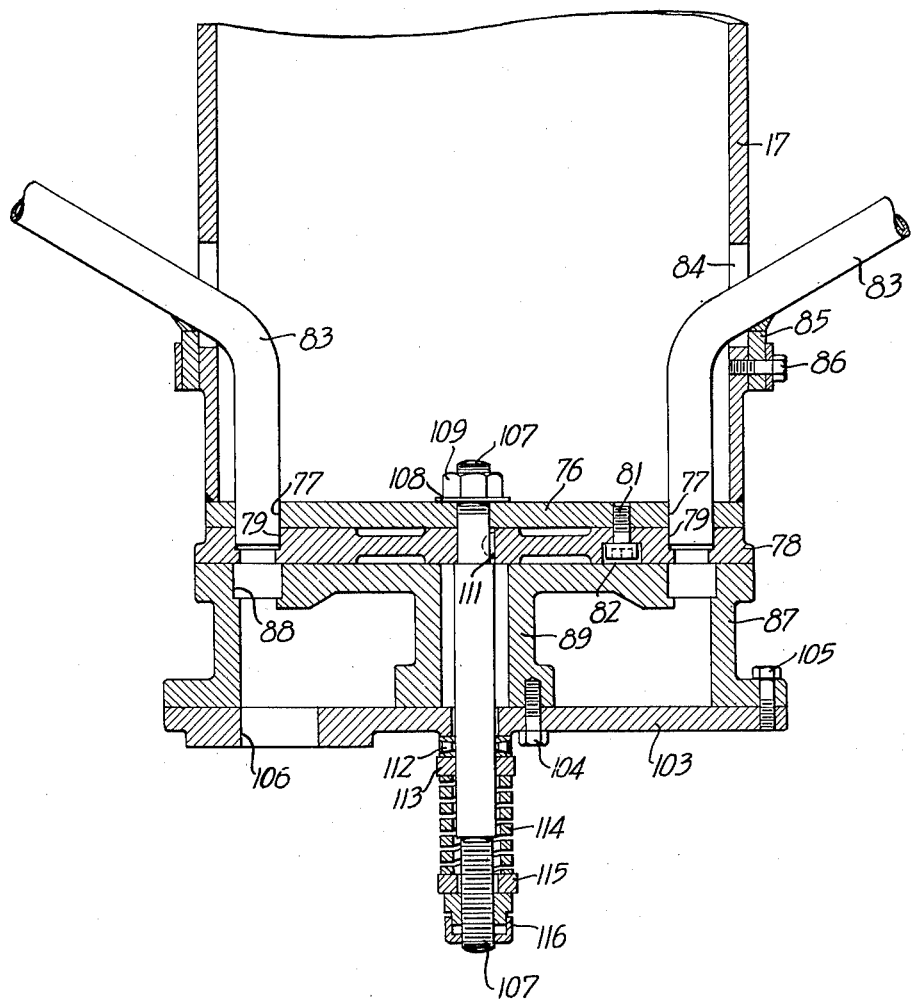
Fig. 5 is a vertical midsection of the automatic filter valve forming part of the filter shown in Figs. 1 and 3.
Figure 6:
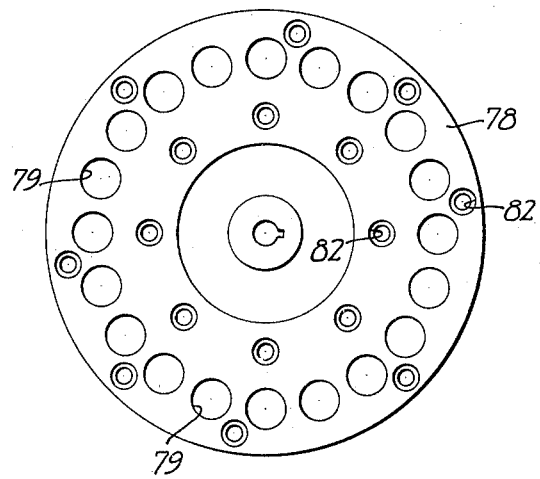
Fig. 6 is a bottom plan view of the wear plate shown in Fig. 5.

As shown in Fig. 5, there is welded to the lower end of valve pipe 17 a pipe plate 76 provided with a circular row of pipe receiving bores 77, there being one such bore for each of the filtrate compartments 64. Seated over the outer face of the pipe plate 76 is a wear plate 78 provided with a circular row of bores 79 arranged to register with the bores 77 of the pipe plate 76. The wear plate 78 is fastened to the pipe plate 76 by machine screws 81, the heads of which are receivable in countersinks 82. Extending into each pair of registering bores 77 and 79 is a filtrate pipe 83 passing through an opening 84 formed in the valve pipe 17 and communicating at its upper end as shown in Fig. 3 with one of the filtrate compartments 64. The filtrate pipes 83 are supported intermediate their ends from the valve pipe 17 by lugs 85 fastened to the pipe 17 by machine screws 86.

Figure 7:
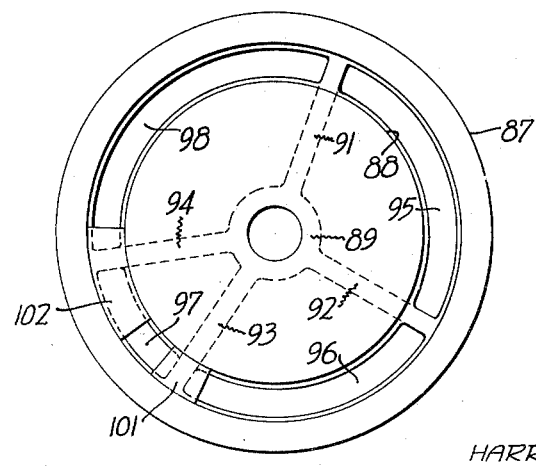
Fig. 7 is a top plan view of the valve body shown in Fig. 5.

Seated over the lower face of the wear plate 78 is a valve body 87 held against rotation by being secured to any stationary portion of the filter foundation in accordance with well known practice. As shown in Figs. 5 and 7, the upper face of the valve body 87 is provided with an annular channel 88 concentric with the bores 77 and 79. The valve body 87 is provided with a central hub 89 and formed integral with this hub are a number of radially extending spiders 91, 92, 93 and 94 serving to divide the annular channel 88 into arcuate ports 95, 96, 97 and 98. In accordance with well known practice, and as shown in Fig. 7, the annular channel 88 is arranged to receive arcuate strips or bridges such as 101 and 102 for the purpose of blanking off any desired portion or portions of the arcuate ports 95, 96, 97 and 98. Seated over the lower flanged face of the valve body 87 is a cover plate 103, this plate being secured to the valve body by machine screws such as 104 and 105. Formed in the cover plate 103 is one or more bores 106 arranged to communicate in accordance with well known practice with any suitable source of vacuum, or with a source of reverse pressure depending upon the cycle of operation which is desired. In this connection it should be observed that in some operations it is desired to separate the clear and cloudy filtrate, to separate the clear filtrate from any wash water which may be used, and in many cases, to aid the discharge of the cake by means of a blow back or reverse pressure. In the present instance the valve body 87 has been illustrated as having only one bore 106 by means of which the valve may be connected to a suitable source of subatmospheric pressure. The valve body 87 is retained in its operative position by means of a bolt 107 extending through the plate 103, the hub 89, the wear plate 78, and the pipe plate 76. Disposed over the upper end of the bolt 107 is a washer 108 and a nut 109, the bolt being fixed against rotation with respect to the pipe plate 76 and the wear plate 78 by a key 111. Mounted on the bolt 107 immediately beneath the cover plate 103 is a thrust bearing 112, and beneath this thrust bearing is a washer 113. Engaging the lower face of the washer 113 is a spring 114 the lower end of which abuts a washer 115. Threaded over the lower end of the bolt 107 is a double lock nut generally designated by the reference numeral 116. By means of this construction the valve body 87 can be biased against the lower face of the wear plate 78 to any extent desired.

Since the valve body 87 is held against rotation as above described, and since the filter and its associated valve pipe 17, pipe plate 76 and wear plate 78 rotate with respect to the valve body, it will be seen that the lower end of each of the filtrate pipes 83 will successively communicate with the arcuate valve ports 95, 96, 97 and 98 so as to be successively subjected to whatever pressure these ports are maintained at. Normally, the pick up or cake formation cycle proceeds under the influence of a vacuum as likewise does the washing cycle, if washing is resorted to. At the discharge zone it may be desired to apply a reverse pressure to each of the filtrate compartments so as to loosen the cake 117 formed and carried thereon.

As shown in Figs. 1 and 3 there is fastened to the plate 9 of the upper ball race on which the annular pan 1 is supported, a spur gear 118 arranged to mesh with a sprocket 119 (Fig. 1) driven by a speed reducer 121. The speed reducer 121 is in turn driven through a belt 122 by a set of spring biased cone pulleys 123 mounted on the shaft 124 of a motor 125. The motor 125 can be made to slide on its base 126 by means of a manually controlled screw 127 so as to increase or decrease the space between the two members of the pulley 123.

The scroll 51 should consist of no less than three flights and the pitch thereof should be substantially equal to their diameter. The diameter of the flights depends upon the depth of the filtrate compartments 64, that is, the distance between the upper edge of the outer rim 4 and the filter medium 74. For many purposes this depth would be in the order of 5 or 6 inches, in which case the diameter of the scroll should be such as to permit ample clearance between the scroll shaft and the upper edge of the rim 4 so that the cake 117 can be readily discharged between the outer rim and the scroll shaft. By resorting to these dimensions the three flights of the scroll will form a substantial dam or barrier across the entire width of the filter pan, thereby preventing the passage of the cake 117 through the scroll before the cake has been made to advance to and over the outer rim 4. In this connection it is to be observed that the function of the scroll is twofold. It must progressively move the cake outwardly towards the rim 4 and simultaneously lift the cake over this rim, and this must be done without permitting the cake to advance beyond the scroll. A continuous filter of any kind is only as effective as the means used for discharging it, for if any substantial amount of solids are permitted to remain on the filter medium, the filter medium will eventually become clogged to a point where further filtration becomes uneconomical. In addition then to the requirements above set forth, there should be a relatively close clearance between the scroll and the filter medium.

From the above description it will be noted that a continuous table type of filter has been provided wherein discharge is effected by a multiple flight scroll having a sufficient number of flights of such a pitch that it forms an effective barrier or dam across the entire width of the pan and by means of which the cake formed and carried by the pan can be effectively moved outwardly thereon and over the rim thereof. Furthermore, the scroll is of such a nature that it occupies only a minimum area of the filter and can be readily adjusted with respect to the filter pan.

I claim:

1. A continuous rotary table filter comprising: an annular pan divided by division strips into a plurality of identical filtrate compartments; a filter medium covering each of said compartments, said pan being provided with inner and outer rims extending substantially above said filter medium; a central upstanding post supported by said pan; an outer horizontally disposed frame supported at its inner end from said post and its outer end by a pedestal; an inner frame adjustably mounted within said outer frame; aligned bearings carried by said inner frame; a scroll discharger journaled in said bearings and receivable within said pan between its outer and inner rims immediately above said filter medium, and a variable speed driving mechanism mounted on said outer rectangular frame for driving said scroll, said scroll having at least three flights each having a pitch equal to the outer diameter of said scroll.

2. A rotary table filter comprising: an annular pan divided by division strips into a plurality of identical filtrate compartments; a filter medium covering each of said compartments, said pan being provided with inner and outer rims extending substantially above said filter medium; a multiple flight scroll mounted radially over said table with its outer end immediately adjacent the inner surface of said outer rim and in position to discharge cake formed on said filter medium, over said rim.

3. A rotary filter of the character defined in claim 2 wherein said multiple flight scroll is provided with at least three flights.

4. A rotary table filter of the character defined in claim 2 wherein said multiple flight scroll is provided with at least three flights, each having a pitch substantially equal to the outer diameter of said scroll.

HARRY W. DENHARD.

REFERENCES CITED

The following references are of record in the file of this patent:

UNITED STATES PATENTS

| Number | Name | Date |
| --- | --- | --- |
| 371,609 | Marr | Oct. 18, 1887 |
| 832,874 | McFlory | Oct. 9, 1906 |
| 1,001,660 | Macklind | Aug. 26, 1911 |
| 2,042,308 | Hardy | May 26, 1936 |

FOREIGN PATENTS

| Number | Country | Date |
| --- | --- | --- |
| 287,513 | Germany | Sept. 27, 1915 |
| 402,505 | Germany | Sept. 20, 1924 |
| 494,209 | Germany | Mar. 20, 1930 |